Figure 7:
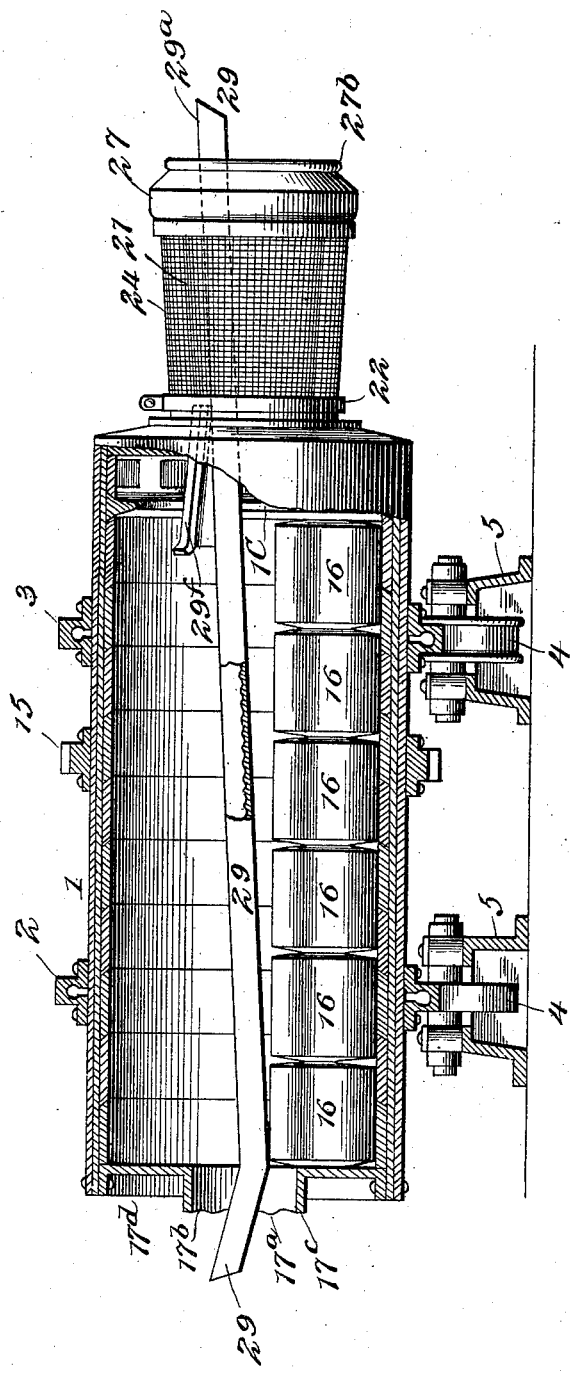

No. 655,745.  
T. C. WALKER.  
CYLINDRICAL ROLLER CRUSHER.  
(Application filed Oct. 8, 1898.)  
Patented Aug. 14, 1900.
(No Model.)  
4 Sheets—Sheet 1.
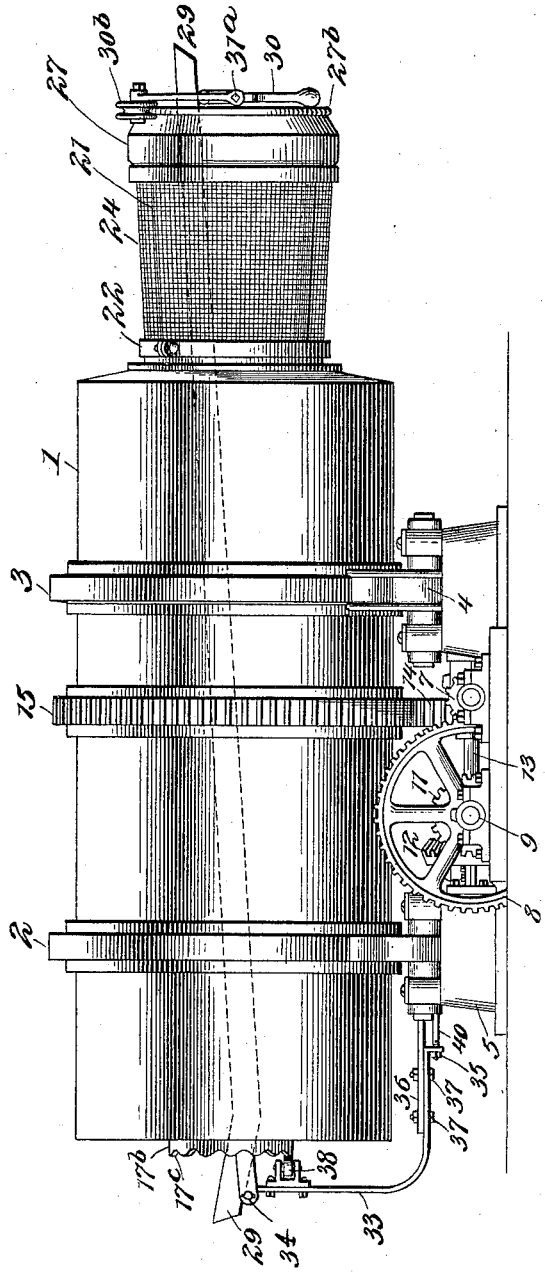

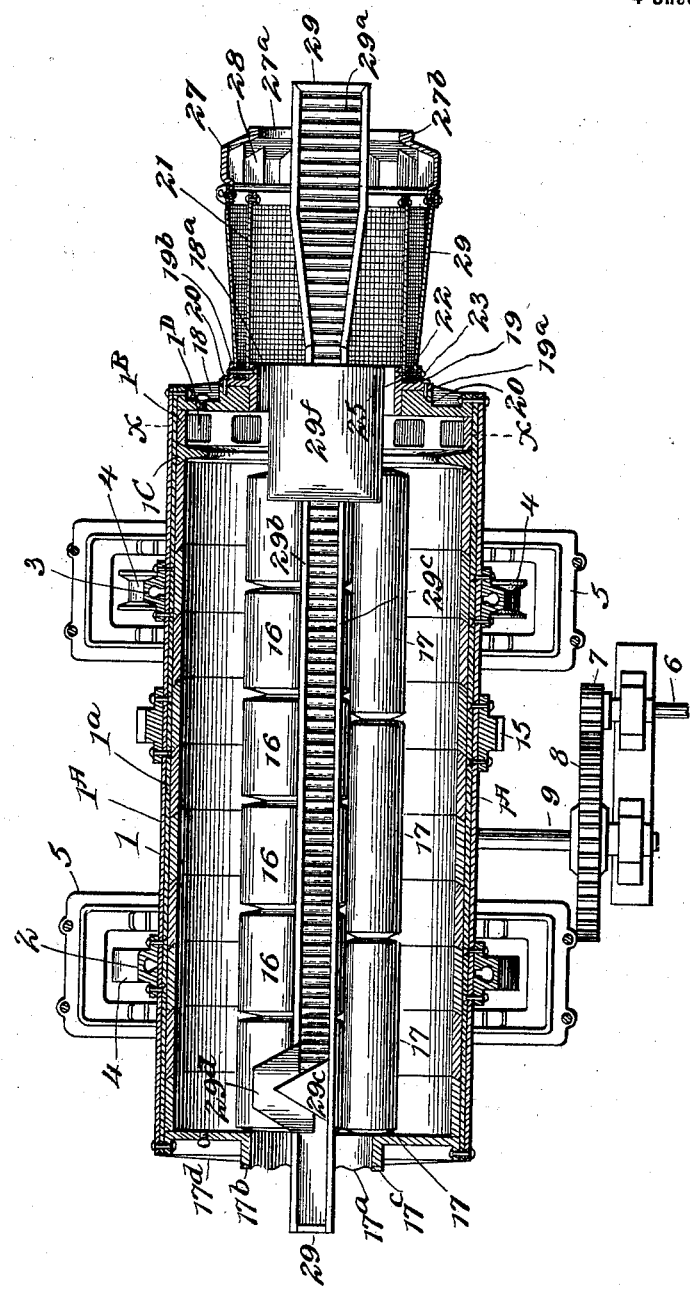

No. 655,745. Patented Aug. 14, 1900.
T. C. WALKER.
CYLINDRICAL ROLLER CRUSHER.
(Application filed Oct. 8, 1898.)
(No Model.) 4 Sheets—Sheet 3.
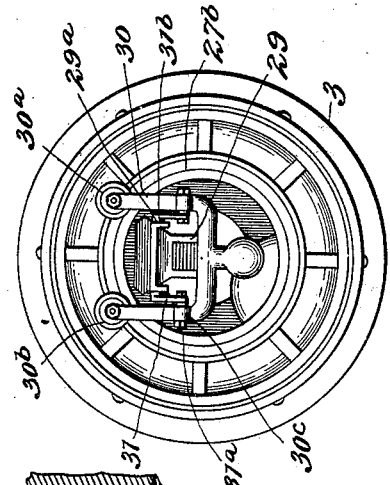
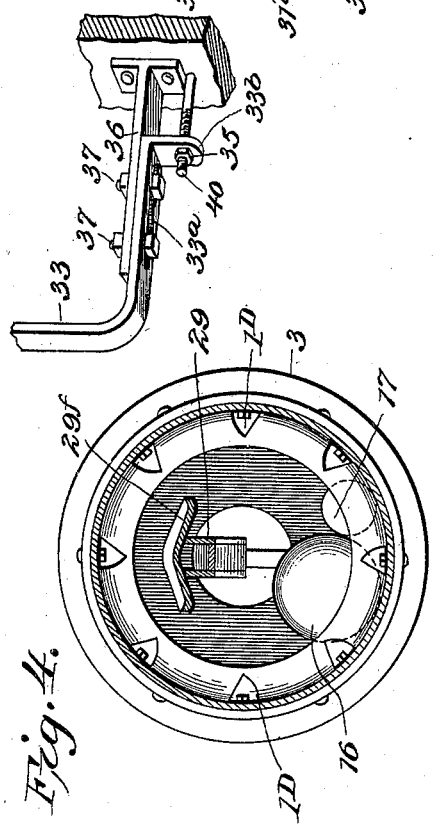
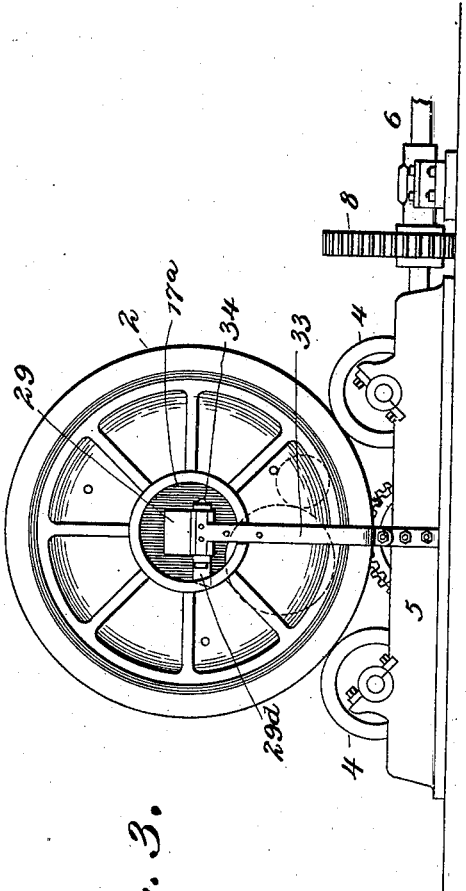
Witnesses
Inventor,
Thomas C. Walker,
by Henry T. Bright
Attorney No. 655,745. Patented Aug. 14, 1900.
T. C. WALKER.
CYLINDRICAL ROLLER CRUSHER.
(Application filed Oct. 8, 1898.)
(No Model.)
4 Sheets—Sheet 4.

Witnesses
J. Ross Colbourn
Frank A. Harrison.

Inventor.
Thomas C. Walker,
by Henry T. Bright
Attorney

UNITED STATES PATENT OFFICE.

THOMAS C. WALKER, OF DENVER, COLORADO, ASSIGNOR OF TWO-THIRDS TO JAMES E. BOWDEN, OF SAME PLACE, AND CHARLES A. GEHRMANN, OF IDAHO SPRINGS, COLORADO.

CYLINDRICAL ROLLER-CRUSHER.

SPECIFICATION forming part of Letters Patent No. 655,745, dated August 14, 1900.

Application filed October 8, 1898. Serial No. 692,999. (No model.)

*To all whom it may concern:*

Be it known that I, THOMAS C. WALKER, a citizen of the United States, residing at Denver, in the county of Arapahoe, State of Colorado, have invented certain new and useful Improvements in Cylindrical Roller-Crushers, of which the following, with the accompanying drawings, is a full, clear, and an exact specification.

My invention relates to mills used in crushing quartz, ore, and other hard substances to a fine granulated powder after having been prepared therefor by other suitable means. In the reduction of ores my improved mill is designed to take the place of stamps in pulverizing the ores after having been crushed preparatory thereto.

The objects of my invention are an improved means of pulverizing ores and other similar substances to a uniformly-fine condition, greater rapidity and economy in operation, and to facilitate the handling of the pulverized material.

Other objects of my invention will appear from the detailed description thereof.

My invention consists in improved means of pulverizing material, in improved means of separating the fully-pulverized material from that requiring further reduction, in means of automatically returning the material when not fully pulverized to subject it to additional grinding until fully reduced, and in the construction and combination of parts and devices described herein.

In the drawings, Figure 1 is a side elevation of my improved mill. Fig. 2 is a plan of the cylinder and the screens shown in axial section on horizontal plane. Fig. 3 is an elevation of the feed end of the mill. Fig. 4 is a vertical section on the line $x\ x$ of Fig. 2. Fig. 5 is a view of the discharge end of the mill, and Fig. 6 is a perspective view of the means for adjusting the spring connection of the feed mechanism. Fig. 7 is a side elevation of the machine, partly in section.

My improvement relates to the cylindrical type of crusher in which 1 is a cylinder made of steel plate. Said cylinder is provided with two rings 2 and 3, that rest in four grooved carrying-rollers 4 4. Said carrying-rollers are suitably journaled upon the machine-bed 5. Power is supplied to the cylinder to rotate it through the shaft 6, the pinion 7, spur-gear 8, shaft 9, bevel-gears 11 and 12, the shaft 13, pinion 14, and the gear 15, surrounding the cylinder 1.

The interior of the cylinder 1 is provided with facing rings $1^A\ 1^A$, whose edges are matched together by scarf-joints $1^a\ 1^a$. The rings may also be matched by concave-convex joints. Said rings are preferably made of hardened steel to resist the wear caused by grinding material in the mill. The rings may be bolted or otherwise secured to the cylinder, and to make a close fit between the outside of the rings and the walls of the cylinder cement, zinc, or any equivalent material may be poured between them.

A single ring $1^B$ is separated from the others by a baffle-ring $1^C$, that is a considerably deeper than the facing rings. Secured to the ring $1^B$ or forming an integral part thereof is a series of buckets $1^D$. Inside of the cylinder is a series of short heavy crushing-rollers 16 16, that are left free to rotate with the rotation of the cylinder. The functions of these short rollers are to crush and pulverize the material in the cylinder as the machine is rotated. Adjacent to the short crushing-rollers is a series of long crushing-rollers 17 17. The crushing-rollers of each series are independent of the adjacent rollers. The two series of rollers being of such different lengths that each of the longer rollers of one series overlaps two (or more) of the rollers of the other series tends to keep all of the rollers practically in line. The rollers of one series, and usually the longer rollers, are preferably of considerably less diameter than the others.

The feed end of the cylinder is closed by a cast-iron head 17', having a central opening $17^a$, around which is an outwardly-projecting flange $17^b$, whose outer edge forms a series of cams $17^c$.

The discharge end of the cylinder is provided with a head 18, having a central opening $18^a$. Within the opening $18^a$ of the head 18 is a thimble 19, having a radially-projecting flange $19^a$. The thimble is secured to the head 18 by bolts 20 20, that pass through the flange $19^a$ into the head 18. An annular flange $19^b$ projects from the flange $19^a$, concentric with the axis of the cylinder. To the thimble 19 is secured a conical screen 21 by means of a band 22, that is fitted over the screen 21, and by bolts 23 23, that pass through the band 22, screen 21, and thimble 19. A finer conical screen 24 is secured to the flange $19^b$ by means of a band 25, that fits over the screen to hold it against the outer side of the flange $19^b$, and by bolts 26 26, that pass through the said band, screen, and flange. The inner screen is preferably of about fifteen mesh, and the outer screen is of about twenty-five mesh. Whatever the mesh of screens employed the coarser screen is upon the inside and the finer screen is upon the outside. Both of said screens are slightly conical, having their smaller ends attached to the cylindrical head 18. The outer end of the outer conical screen is secured to an annular end casting 27, that has a central opening $27^a$ at its outer end. The end pieces 27 are provided with a series of interior buckets 28. Said buckets may be made integral with or attached to the inner face of the end piece. An annular radial flange $27^b$, formed around the mouth $27^a$ of the end piece 27, forms a runway for the friction-rollers of the hanger hereinafter described.

A feed-trough 29 extends through the cylinder and the conical screens and has its ends projecting beyond the ends of the machine. The discharge end of the feed-trough is supported by a rectangular frame 30, that is provided with grooved rollers $30^a$ and $30^b$ at its upper end to ride upon the round flange $27^b$ of the end piece 27. Rocking links 31 31, having lateral pins $31^a$ $31^a$, that are held in bearings $30^c$ $30^c$ of the frame 30, and pins $31^b$ $31^b$, that are held in bearings $29^a$ $29^a$ of the trough 29, allow the trough to have a reciprocating movement through the hanger-frame 30. The front end of the feed-trough 29 is supported by a heavy flat spring 33. The spring 33 and the front end of the trough 29 are pivotally connected by a pin 34. The lower end of the spring 33 is bent backwardly under the end of the cylinder 1 and is provided with a slot $33^a$, Fig. 6, to provide for adjusting the tension of the spring. The extreme end $33^b$ of the spring 33 is bent downwardly and is perforated to receive the outer threaded end of a bolt 34, that is secured to the bed of the machine. A nut 35 is screwed upon the outer end of the bolt 34 to hold the spring while its adjustment is being secured. A bracket 36 projects outwardly from the bed 5 of the machine. Bolts 37 37 pass through the slot $33^a$ of the spring 33 and through the bracket 36 to secure the adjustment of the spring. Upon the inner side of the spring 33, below the trough 29, is journaled a roller 38, that is held in close contact against the cams $17^c$ of the flange 17. As the roller 38 is held in close contact against the cams, as described, the feed-trough 29 is given a reciprocating or longitudinal shaking movement.

The feed-trough 29 consists of a riffled or plain bottom $29^a$ and side pieces $29^b$ $29^c$. Near the feed end of the cylinder the side piece $29^b$ of the feed-trough is cut away, and a spout $29^d$ is inserted inside to conduct the material fed into the machine from the feed-trough in front of the first crushing-roller 16 in the mill. A block $29^e$, placed in the feed-trough 29 at the center of the spout $29^d$, serves to conduct the material from the trough out of the spout and not to allow the material in the trough to pass by the spout in either direction. Material may be fed into the machine at either end, as material fed from either end of the machine will be thrown in front of the first crushing-roller through the spout $29^d$.

Resting upon the sides $29^b$ and $29^c$ of the trough 29 is a pan $29^f$, whose sides slope downwardly, as illustrated in Fig. 4. The pan $29^f$ is attached to the said trough and is reciprocated with it.

My improved grinding-mill having been fully described in detail its operation will be readily understood. Material to be ground in the mill is fed into the feed-trough at either end, as described, and passes in front of the first crushing-roller. As the material is ground by the action of the two series of rollers described the material works toward the discharge end of the cylinder until it reaches the baffle-ring $1^c$. In the revolution of the cylinder and of the crushing-rollers the finer of the ground material has a tendency to rise to the top of the material in the cylinder, and the finer ground material when it reaches the upper edge of the baffle-ring $1^c$, passes over said baffle-ring into the space between the said ring and the discharge end of the cylinder. In the revolution of the buckets $1^D$ with the cylinder the material that passes over the baffle-ring is carried up and discharged upon the pan $29^f$. Said pan slopes slightly toward the discharge end of the mill or toward the screens. The material thrown upon the pan by the buckets $1^D$ is shaken off at the sides of the pan into the interior of the conical screens. As the screens revolve with the cylinder all except the coarsest of the material pass from the inner screen into the outer screen. Such part of the material as will not pass through the inner screen will pass from its outer end and be carried by the buckets 28 up and discharged into the trough 29. The material passing through the inner screen is subjected to a second screening by the outer conical screen. All of the material that passes from the outer screen is a finished product ready to be passed onto the jigs. Such material as will not pass through the outer screen and is not ready for the jigs will pass on into the buckets 28 and be carried upward and be discharged into the trough 29. All of the material that is carried from the screens by the buckets 28 to the trough 29 finds its way backward down the trough in front of the first crushing-roller and is again passed through the mill. The material when once fed into the mill will be returned again and again to the rollers until it is ground to a fine product.

From the detailed description given of my improved mill and from the description of its operation many of its advantages are apparent. The construction of the grinding-rollers and the employment of the two series of rollers, substantially as described, prevent the material from banking up inside of the cylinder and making the rollers ineffective. The constant discharge of the ground material from them in the process of grinding prevents the material from clogging and facilitates the action of the crushing-rollers in reducing the material in the cylinder. The carrying of the ground material from the cylinder into the screens continuously prevents all clogging and facilitates screening by reason of a constant feed of the material into the screens. The employment of double screens of different meshes facilitates the separation of the coarser material from that fully ground and gets the fully-reduced material out of the mill with greater rapidity. The return of the unfinished product for regrinding, as described, produces economy in operation and in the result. A mill embodying my improvement has greater capacity than mills heretofore in use, the product is more perfect and uniformly reduced, and this construction prevents the formation of a slime such as is found in stamping-mills and which is very undesirable and prevents a perfect reduction of the material.

What I claim as my invention, and desire to secure by Letters Patent, is—

1. The combination, with a rotatable cylinder, of a series of rollers in a line therein, and an independent roller or rollers each of greater length than the rollers comprising the first-named series adapted to roll parallel to the said series of rollers within the cylinder, substantially as described.

2. The combination of a rotatable cylinder provided with a baffle-ring near one end and a series of buckets between the baffle-ring and the end of the cylinder, and a reciprocating pan discharging through the end of the cylinder into which said buckets may discharge their contents, substantially as described.

3. The combination of a rotatable cylinder provided with ends having central openings, a screen at one end of the cylinder, crusher-rollers within the cylinder, a trough extending through the cylinder and screen longitudinally, a hanger supported by the end piece of the cylinder for supporting the trough, and means for reciprocating the trough, substantially as described.

4. The combination of a rotatable cylinder provided with ends having central openings, crushing-rollers within the cylinder, a reciprocating trough through the cylinder, a baffle-ring forming an annular wall near one end of the cylinder, a series of buckets between the baffle-wall and the discharge end of the cylinder, and a pan carried by the trough upon which the said buckets may discharge their contents, substantially as described.

5. The combination with a rotatable cylinder of a cylindrical screen that rotates with the cylinder, a trough passing through the screen into the cylinder, a frame carried by the end of the cylinder for supporting the trough, and a series of buckets at the free end of the screen adapted to empty their contents into the trough, substantially as described.

6. In a grinding-mill, two concentric conical screens attached to one end of a cylinder of a stone-crusher, a series of buckets into which the material that will not pass through the screens empty, a trough for returning the material that passes into said buckets to the grinding mechanism of the mill, a frame having rollers running on a flange of the end of the screens for supporting the trough, substantially as described.

7. The combination of a rotatable cylinder provided with heads having central openings, a series of crushing-rollers in the cylinder, a cylindrical screen attached to the discharge end of the cylinder, a baffle-ring near the discharge end of the cylinder, a series of buckets between the baffle-ring and the discharge end of the cylinder, a series of buckets at the outer end of the screens, a trough extending through the cylinder and the screen, said trough having a spout near the feed end of the cylinder, a pan above the trough and adapted to receive material discharged from the buckets between the baffle-ring and the discharge end of the cylinder, and means to reciprocate the said trough and pan, substantially as described.

In testimony whereof I affix my signature in the presence of two witnesses.

THOMAS C. WALKER.

Witnesses:
ARTHUR A. SELLECK,
THOS. C. WALKER, Jr.